WALTER G. GATES
INVENTOR.

BY John R. Faulkner
John J. Boethel
ATTORNEYS

United States Patent Office 3,432,005
Patented Mar. 11, 1969

3,432,005
SELF-CLEANING OIL FILTER SYSTEMS
Walter G. Gates, Allen Park, Mich., assignor to Ford Motor Company, Dearborn, Mich., a corporation of Delaware
Filed Aug. 31, 1966, Ser. No. 576,302
U.S. Cl. 184—6
Int. Cl. F01m 1/00; F16n 17/06, 29/00
6 Claims

ABSTRACT OF THE DISCLOSURE

A self-cleaning lubricant (oil) filter unit having biased valve means sensitive to the pressure differential across the filter. Upon the filter becoming clogged and affecting the pressure differential, the direction of oil flow through the filter element is automatically reversed to provide a back-flushing action to dislodge the contaminants from the surface of the filter element.

---

Figure 1:
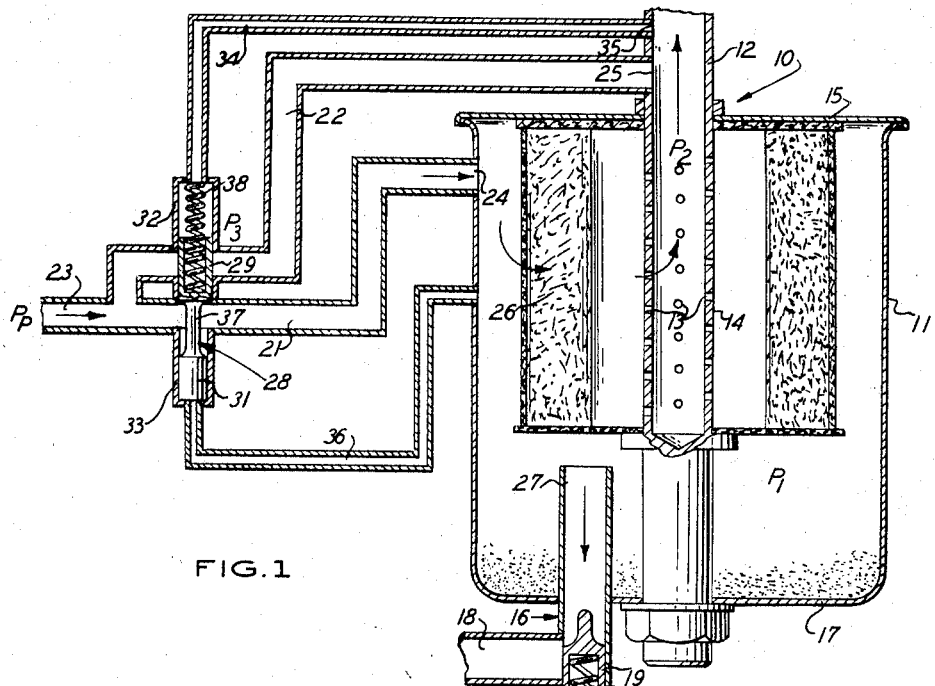

This invention relates to lubrication systems such as are found in internal combustion engines and especially to lubrication systems having self-cleaning lubricant (oil) filter units.

Whereas it was not too many years ago that automobile engine manufacturers were recommending that the lubricants or oils used in internal combustion engines be changed every one thousand miles or every thirty days, whichever occurred first, the recommended interval for oil changes is now every four to six thousand miles or every four to six months, whichever occurs first. There is a caveat that the longer interval between oil changes applies only to normal driving conditions and that the oil changes should be more frequent when driving in unpaved or dusty areas. The increase in the time interval for recommended oil changes is the result of the availability of "long life" lubricants and in improved oil filter units incorporated in the lubrication systems. Since the oil filter elements used in oil filter units for modern vehicle lubrication systems are frequently of the surface filtration type, there is always present the possibility, however, that under adverse driving conditions the filter element will be clogged to such an extent that it will fail to function thereby causing unfiltered oil to be bypassed directly to the engine parts to be lubricated.

It is an object of the present invention to provide for self-cleaning of a surface filtration type filter element whenever it becomes clogged to such an extent that it loses its effectiveness to permit the free flow of filtered oil into the engine parts requiring lubrication. This is accomplished by providing a plurality of inlet conduits in communication with the filter unit housing. These inlet conduits are a main inlet flow conduit and a bypass flow conduit both in communication with a lubricant supply source. A biased valve means is normally positioned across the inlet conduits to permit lubricant flow through the main inlet conduit into the housing while preventing flow through the bypass conduit. The biased valve is vented to or in communication with both sides of the filter element so that it is sensitive to the pressure differential across the filter. Upon the pressure within the housing building up because of the resistance of a clogged filter to the lubricant flow into the discharge outlet, the valve is shifted in a direction to block flow into the main flow inlet conduit and to direct flow through the bypass conduit. The lubricant flow from the bypass conduit flows in part directly to the lubricant discharge conduit so that the engine parts to be lubricated are temporarily lubricated by unfiltered lubricant and in part in backflushing direction through the surface filtration type filter element. The backflushing action continues until a sufficient amount of the impurities on the surface of the surface filtration type filter element become dislodged and fall to the bottom of the housing for subsequent removal. As the backwashing action unclogs the filter element, the pressure differential across the element then will decrease. The biased valve will then assume its original position and the cycle will be repeated.

Figure 2:
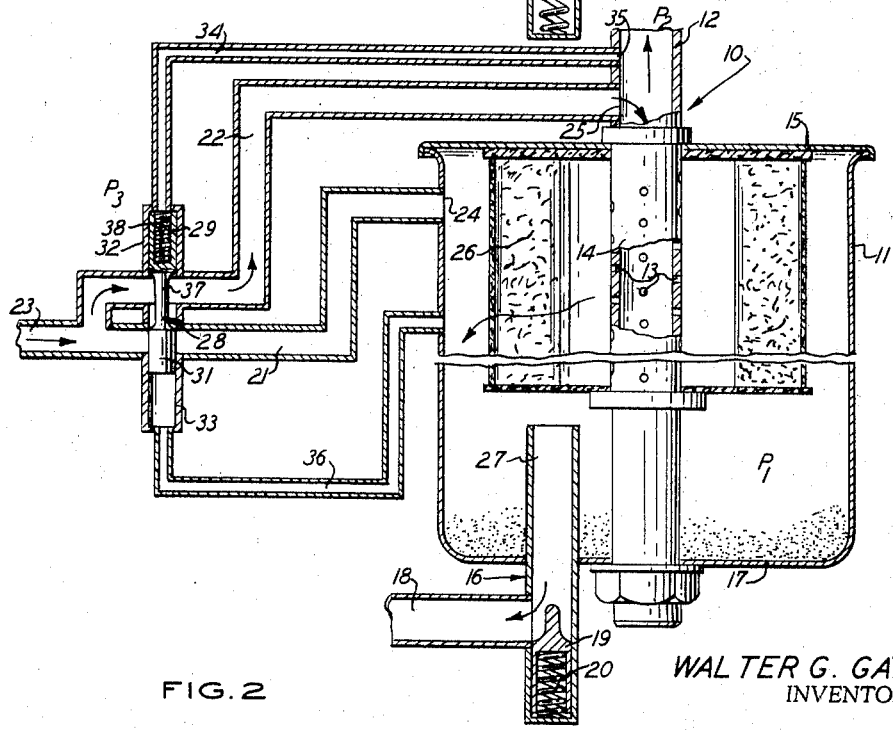

Other objects, advantages and features of this invention will become more apparent as this description proceeds, particularly when considered in connection with the accompanying drawings in which:

FIG. 1 is a semi-diagrammatic illustration of the lubrication system embodying the present invention under normal lubricant or oil flow conditions; and FIG. 2 is a view in part similar to FIG. 1 illustrating the system under filter element backflushing conditions.

Referring now to the drawings in detail, there is illustrated a portion of a lubrication system, preferably a system for supplying oil to moving parts of an internal combustion engine. The illustrated portion of the system, generally designated 10, comprises an oil filter housing 11. The housing 11, which is substantially cylindrical in shape, has a plurality of outlet and inlet conduits in communication with its interior chamber. One of the outlet conduits comprises a hollow and perforated tube 12 extending axially of the housing. The perforations 13 in the hollow tube 12 are in the extension 14 of the tube which extends downwardly into the housing 11. The tube 12 extends upwardly through the upper cover 15 of the filter housing.

A second outlet tube 16 extends downwardly through the bottom wall 17 of the housing 11. The second outlet tube 16 is provided with a branch 18 which is a return line to an oil sump or the oil pan of an internal combustion engine. The volume of oil flowing from the outlet tube through the branch 18 is controlled by a pressure regulator valve 19, the latter being biased in branch 18 closing direction by a spring 20.

The inlet conduits to the housing 11 comprise a main inlet flow conduit 21 and a bypass flow conduit 22, both of which are connected to a common supply source of lubricant or oil such as a pump (not shown) or other source of supply through a conduit 23. The main inlet flow conduit has direct communication with the housing 11 through a port 24. The bypass flow conduit communicates with the chamber of the housing through a connection at 25 with the hollow tube or outlet conduit 12 outside the filter housing.

A surface filtration type filter element 26 encompasses the perforated portion 14 of the outlet tube 12. As indicated by the arrows in FIG. 1, the normal flow of lubricant or oil through the filter unit is from the main inlet conduit 21 through the port 24 into the housing 11 and then through the surface filtration type filter element 26 through the perforations 13 into the hollow outlet tube 12 which leads to the engine parts to be lubricated.

In order to assure the engine a constant supply of oil, the oil pump normally delivers a quantity of oil in excess of engine requirements. In conventional lubrication systems, a regulator valve is located in the oil pump and allows this excess oil to recirculate within the pump itself.

In the system embodying the present invention, however, the regulator valve is the valve 19 located in the lower outlet pipe 16. The outlet pipe 16 has a substantial portion 27 projecting upwardly into the housing in the form of a stand pipe. When the filter element 26 is clean, most of the oil coming into the housing is able to flow through the filter element to the outlet pipe 12 and the excess or overflow is returned to the oil pan or sump through the regulator valve 19. As shown, the regulator valve under this condition substantially but not completely closes off the outlet branch 18 of the outlet pipe 16 so as to maintain the proper pressure within the filter housing.

As the surface filtration type filter element becomes clogged with dust particles or other foreign matter, the lubricant pressure within the housing will increase and the amount of oil flowing through the outlet pipe will begin to decrease. Eventually a condition could be reached at which the filter element would become so clogged that no oil would be able to pass through it. The oil would then be directly returned to the engine sump through the relief valve 19 and the engine parts would be starved of necessary lubrication. To prevent this from occurring, the system is provided with a relief or shuttle valve 28.

The relief or shuttle valve 28 is vented to both sides of the filter element so that it is sensitive to the pressure differential across the filter element. This is diagrammatically illustrated in FIGS. 1 and 2 in which the shuttle or relief valve 28 is shown as comprising an upper cylindrical portion 29 and a lower cylindrical portion 31 each of which are housed in respective cylindrical housing sections 32 and 33. The upper cylindrical housing 32 is vented through a conduit 34 which extends from the upper end of the relief valve upper cylinder housing 32 to a connection at 35 with outlet pipe 12 outside of the filter housing 11. Thus, the pressure of the lubricant or oil in the conduit 34 will be substantially that of the pressure in the outlet conduit 12.

The lower end of the relief or shuttle valve 28 is vented or is in communication with the filter housing 11 through a conduit 36 which extends from the lower end of the relief or shuttle valve lower cylinder housing 33 to a wall of the filter housing 11. Thus, the pressure of the lubricant or oil in the conduit 36 will be substantially that of the lubricant or oil within the filter housing 11. The upper and lower portions 29 and 31 of the shuttle or relief valve 28 are joined by a reduced neck portion 37. The upper cylindrical portion of the shuttle or relief valve 28 is illustrated as being substantially hollow so as to form in part in housing for a compression spring 38.

As seen in FIG. 1, which represents the condition of the system when the filter element is clean, the relief or shuttle valve upper cylindrical portion 29 completely cuts off flow through the bypass conduit 22 while the reduced portion 37 only prevents slight obstruction to flow through the main conduit 21. In filter element clogged condition, as shown in FIG. 2, the lower cylindrical portion of the relief or shuttle valve completely cuts off flow through the main conduit 21 to the filter housing while permitting flow through the bypass conduit 22.

The spring rate of the relief or shuttle valve return spring or compression spring 38 is such that it will compress when the pressure differential across the filter becomes excessive, i.e., when the filter becomes clogged. When clogging occurs, the oil pressure on the downstream side of the filter element decreases and the shuttle valve is forced, against the force of the spring 38, toward the opposite end of its housing. In this position the shuttle valve causes the oil flow from the pump or the main conduit 23 to bypass the filter element through the by-pass flow conduit. The oil supply to the engine will, therefore, be unfiltered. The oil, in excess of engine requirements, for return to the oil pan will flow in reverse direction through the filter element as shown by the arrows in FIG. 2. A backwashing action of the filter element will thus take place and the dislodged dirt or other foreign matter clogging the filter will settle to the sump in the bottom of the housing 11 from which it may be removed at periodic intervals. As the backwashing action unclogs the filter element, the pressure differential across the element will decrease. The return or compression spring 38 will then cause the shuttle valve or relief valve 28 to assume its original position and the cycle will be repeated.

The foregoing may be numerically illustrated by assuming certain values for the inlet pressure, the outlet pressure and the pressure acting on the shuttle valve. With a clean filter the pressure differential across the filter element $P_1-P_2$ may be assumed as being about 2 p.s.i. It may be assumed that the lubricant is being received from the supply source or pump into the conduit 23 at about 58 p.s.i. Discounting frictional losses in the conduits, the pressure $P_1$ in the housing will then also be about 58 p.s.i. The pressure $P_2$ in the outlet pipe 12 will be about 56 p.s.i., taking into account the 2 p.s.i. loss through the filter element. The spring rate for the spring 38 acting on the shuttle valve may be assumed as 8 p.s.i. at compressed height. Thus, the pressure $P_3$ acting on the shuttle valve will be $P_2$ plus the spring rate or 56 p.s.i. plus 8 p.s.i. for the total of 64 p.s.i.

It will now be assumed that the filter is considered as being too clogged when the pressure differential $P_1-P_2=9$ p.s.i Since the lubricant input pressure was 58 p.s.i. (assumed), the pressure $P_1$ in the housing is 58 p.s.i. and the pressure in the outlet tube 12 is thus reduced to 49 p.s.i. Pressure $P_3$ acting on the shuttle valve equals the pressure $P_2$ in the outlet tube 12 or 49 p.s.i. plus the 8 p.s.i. spring rate or 57 p.s.i. The pressure in conduit 34 reflects the $P_2$ pressure plus the spring rate pressure and the pressure in the conduit 36 reflects the $P_1$ or housing pressure. Disregarding frictional losses, there is then a 9 pound differential in pressure acting on the opposite ends of the shuttle valve or sufficient pressure to overcome the 8 p.s.i. spring rate. The shuttle valve will then be moved upwardly to the position in which it closes the main inlet conduit 21 so that no oil can flow directly to the filter housing but must come in by way of the bypass conduit 22, through the outlet pipe 12, through the perforations 13 in the outlet pipe portion 14 and then through the filter element 26 in a reverse direction to create the backflushing action.

Under the pressures assumed above, the rectangular valve would operate in a range of 52–62 p.s.i.

It will be understood that the invention is not to be limited to the exact construction shown and described, but that various changes and modifications may be made without departing from the spirit and scope of the invention as defined in the appended claims.

I claim:
1. In a lubrication system,
    a filter housing having a plurality of outlet and inlet conduits in communication therewith,
    a first one of said outlet conduits being for lubricant discharge and having a perforated part thereof extending into said housing,
    a second one of said outlet conduits being in communication with an oil sump,
    said lubricant inlet conduits comprising a main inlet flow conduit and a bypass flow conduit both in communication with a lubricant supply source to receive lubricant therefrom,
    a surface filtration type filter element within said housing encompassing said perforated part of said first outlet conduit,
    normal lubricant flow being through the main inlet conduit into the housing through the filter element into the first outlet conduit,
    biased valve means normally positioned across said inlet conduits to permit lubricant flow through said main inlet conduit into said housing and preventing flow through said bypass conduit,
    said biased valve means being in communication with both sides of said filter element so that it is sensitive to the pressure differential across the filter,
    said biased valve means upon a predetermined pressure differential being reached being shiftable to block flow through said main flow inlet conduit and to cause flow through said bypass conduit to provide a backflushing action on said filter element.
2. In a lubrication system according to claim 1;

a pressure regulator valve located in said second outlet conduit to control the return to the oil sump of lubricant in excess of first outlet discharge requirements.

3. In a lubrication system according to claim 1 in which:
the biased valve means is in communication with said filter element through a first conduit means communicating one end of said biased valve means with said first outlet conduit on the outlet side of said filter element and a second conduit means communicating the other end of said biased valve means with said housing on the inlet side of said filter element.

4. In a lubrication system according to claim 3;
a pressure regulator valve located in said second outlet conduit to control the return to the oil sump of lubricant in excess of first outlet discharge requirements.

5. In a lubrication system,
a filter housing having a plurality of outlet and inlet conduits in communication therewith,
a first one of said outlet conduits being for lubricant discharge and having perforated part thereof extending into said housing,
a second one of said outlet conduits being in communication with an oil sump,
said lubricant inlet conduits comprising a main inlet flow conduit and a bypass flow conduit both in communication with a lubricant supply source to receive lubricant therefrom,
a surface filtration type filter element within said housing encompassing said perforated part of said first outlet conduit,
normal lubricant flow being through the main inlet conduit into the housing through the filter element into the first outlet conduit,
biased valve means normally positioned across said inlet conduits to permit lubricant flow through said main inlet conduit into said housing and preventing flow through said bypass conduit,
and a first conduit means communicating one end of said biased valve means with said first outlet conduit on the outlet side of said filter element and a second conduit means communicating the other end of said biased valve means with said housing on the inlet side of said filter element,
said biased valve means being responsive to the lubricant pressure differential between the inlet and outlet sides of said filter whereby when a predetermined pressure differential is reached said valve means is shifted to block flow through said main flow inlet conduit and to direct flow through said bypass conduit,
the lubricant flow from said bypass conduit flowing in part directly to said lubricant discharge conduit and in part in backflushing direction through said surface filtration type filter to remove the impurities trapped on the surface thereof and causing said impurities to drop to the bottom of said housing.

6. In a lubrication system according to claim 5;
a pressure regulator valve located in said second outlet conduit to control the return to the oil sump of lubricant in excess of first outlet discharge requirements.

References Cited

UNITED STATES PATENTS

| | | | |
|---|---|---|---|
| 1,913,402 | 6/1933 | Liddell. | |
| 2,108,798 | 2/1938 | Dalrymple | 210—108 |
| 2,253,690 | 8/1941 | Dalrymple | 210—108 |
| 3,157,131 | 11/1964 | Brydon | 210—108 X |

LAVERNE D. GEIGER, *Primary Examiner.*

E. J. EARLS, *Assistant Examiner.*

U.S. Cl. X.R.

123—196; 210—108